United States Patent [19]

Kitamura et al.

[11] Patent Number: 4,486,828
[45] Date of Patent: Dec. 4, 1984

[54] DATA PROCESSING SYSTEM PROVIDING DATA SECURITY THROUGH CODED IDENTIFICATION OF ACCESSING TERMINALS

[75] Inventors: Junji Kitamura; Fumiya Murata; Noboru Nakamura, all of Hadano, Japan

[73] Assignee: Hitachi, Ltd., Tokyo, Japan

[21] Appl. No.: 349,814

[22] Filed: Feb. 18, 1982

[30] Foreign Application Priority Data

Feb. 20, 1981 [JP] Japan .................................. 56-23028

[51] Int. Cl.³ ............................. G06F 3/04; H04L 9/00
[52] U.S. Cl. .................................. 364/200; 178/22.01
[58] Field of Search ... 364/200 MS File, 900 MS File, 364/737, 741; 178/22.01, 22.08, 22.13; 340/825.3, 825.31, 825.32, 825.33, 825.34; 235/379, 380, 382, 382.5; 371/25

[56] References Cited

U.S. PATENT DOCUMENTS

4,000,487 12/1976 Patterson et al. .................. 364/200
4,003,032 1/1977 Austin et al. ....................... 364/200
4,183,085 1/1980 Roberts et al. ..................... 364/200
4,218,738 8/1980 Matyas et al. ...................... 364/200
4,245,308 1/1981 Hirschman et al. ................ 364/200
4,259,720 3/1981 Campbell .......................... 364/200
4,310,720 1/1982 Check, Jr. ........................ 178/22.08
4,348,739 9/1982 Deaver et al. ..................... 364/900

Primary Examiner—Raulfe B. Zache
Assistant Examiner—Mark P. Watson
Attorney, Agent, or Firm—Antonelli, Terry & Wands

[57] ABSTRACT

A data processing system includes a host unit and terminal equipment connected thereto. Different terminal equipment is identified on the basis of a program provided on the side of the host unit and on the basis of data transaction with the hardware of the terminals. To this end, a microprogram is transferred from the host computer to the terminals, while the result of execution of the microprogram determined on the basis of the types of the terminals and components thereof is transferred to the host computer from the terminal. In this way, confidential security is assured between the host and the terminals.

5 Claims, 7 Drawing Figures

DATA PROCESSING SYSTEM PROVIDING DATA SECURITY THROUGH CODED IDENTIFICATION OF ACCESSING TERMINALS

BACKGROUND OF THE INVENTION

The present invention relates generally to a data processing system, and in particular concerns the assurance of confidential security in a terminal processing system which includes a host unit and terminal equipment connected thereto.

There has been known a terminal processing system in which a number of input/output terminals are connected to a host unit constituted by a computer, terminal control equipment or the like for performing various data processing operations.

In recent years, it has become possible to process rapidly a mass quantity of data in a terminal processing system of the type mentioned above through centralized data processing by means of a central computer or through distributed or dispersed data processing, as a result of which the inputting and outputting of data to and from the terminals and hence data access at the terminals can be effected in a facilitated manner.

On the other hand, the ease in making access to data brings about many problems, such as the destruction of data, leakage of secret or confidential information and the like. To deal with such problems, various measures have been proposed. Among them, there can be mentioned a security system in which the identity or password of the user is confirmed through appropriate operations at the terminal before the processing as required is initiated or when access to data is requested. In another security system, data transfer is performed for identification of the user between the host computer and the terminal in precedence to the processing as requested. In connection with the security system in which identification data is transferred between the host computer and the terminals for assuring security in the use of the system, it is known that the identification data is previously set in memories or switch circuits of the host computer and the terminals, respectively, and wherein, for establishment of communication, the identification data is mutually exchanged between the host computer and the terminal to which a request for data access is issued. When coincidence is recognized between the identification data, then communication is allowed to be established between the host computer and the terminal in question.

In contrast, in the case of the first mentioned security system which resorts to operations in the terminal, there arises a problem that different terminals can not be discriminated from one another so that access to the host computer may possibly be allowed from any of the terminals through the same operation. On the other hand, in the case of the second mentioned security system in which the identification data is mutually transferred, it is required to set the identification data by switches on the side of the terminal. Further, because the exchange of the identification data or code is executed constantly in a predetermined sequence with a predetermined invariable code value, the security can not be assured in a satisfactory manner, involving possibly leakage of confidential data.

SUMMARY OF THE INVENTION

An object of the present invention is to provide a data processing system which allows security of data to be assured in a satisfactory manner between a host system computer and terminal equipment connected thereto.

Another object of the invention is to provide an information processing system in which the differences among terminal equipment can be automatically discriminated by a host unit by means of hardware in a manner difficult to be externally interpretatively leaked without resorting to a difficult operation.

In view of the above object, there is proposed according to an aspect of the present invention a data processing computer which includes a host system and a plurality of terminals connected thereto and in which the differences between the terminals are discriminated through data exchange executed between programs provided on the side of the host computer and the terminals. More particularly, there are provided on the side of the host computer a memory for storing programs prepared in accordance with predetermined algorithms and checking means for determining whether the result of processings, executed on the programs on the terminal side coincides with an expected value. The terminal includes means for loading the programs from the host computer and operational means for performing arithmetic operations in the terminal in accordance with the loaded programs. The result of the operations executed through the operational means is transferred to the host computer, whereby a logical connection is allowed to be established between the host computer and the terminal in question only when the transferred result of the operations has proven to be correct.

DETAILED DESCRIPTION OF THE PREFERRED EMBODIMENTS

Figure 1:
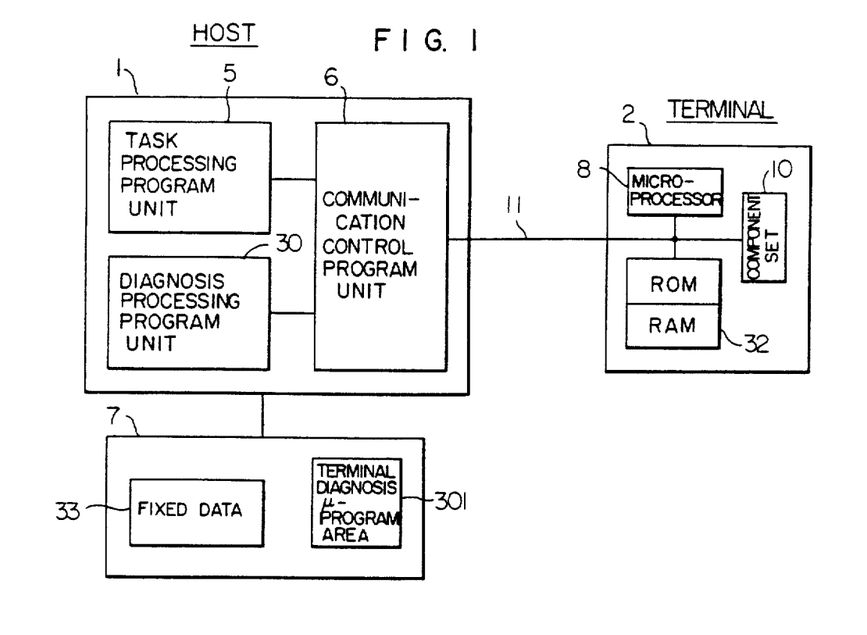
FIG. 1 shows in a block diagram a general arrangement of a data processing system to which an exemplary embodiment of the invention may be applied.

FIG. 1 schematically shows in a block diagram a general arrangement of a data processing system. Referring to this figure, a central processing unit composed of a host computer 1 belonging to a computer system is connected to a terminal 2 by way of a line 11. In general, data accessing to or from the terminal 2 from or to the host computer 1 is permitted through a logical connection (hereinafter referred to also as a session) which has to be previously established between the terminal 2 and a task processing unit 5 of the central processing unit or host computer 1 through a communication control program unit 6 in response to a request issued from the task processing program unit 5 of the host computer 1 or from the terminal 2.

Data file 7 provided in cooperation with the host computer stores a terminal diagnosis microprogram 301 in a terminal diagnostic microprogram area and fixed data 3. The diagnosis microprogram of the area 301 is read out from the data file 7 through execution of a diagnosis processing program stored in a diagnosis processing program unit 30 and is fed to the terminal 2 on the line 11 under the control of a communication control program unit 6 so as to be stored in a memory 32 of the terminal 2.

The diagnosis processing program unit 30 is a program prepared for use in performing various diagnosis of the central processing unit or the host computer 1 and the whole system. In the illustrated system, the terminal diagnosis microprogram 301 read out from the data file 7 is validated through execution of the diagnosis processing program of the unit 30. When the terminal diagnosis microprogram 301 read out from the data file 7 with the aid of the diagnosis processing program unit 30 is to be tranferred to the terminal 2, an identification code is added to a leading microprogram portion of the diagnosis microprogram 301 to identify that it is a diagnostic microprogram. This identification code is of a several-byte length and contains at a predetermined byte position information indicating the data length of the terminal diagnosis microprogram 301. Subsequently, the identification code and the terminal diagnosis microprogram 301 to which is added the identification code are transferred to the terminal 2 through the line 11 as data of a general type under the control of the communication control program unit 6 of the central processing unit 1.

The terminal equipment 2 includes a microprocessor 8, a memory 32 and other components generally indicated by a reference numeral 10. Details of the terminal 2 are illustrated in FIG. 2, by way of example.

Figure 2:
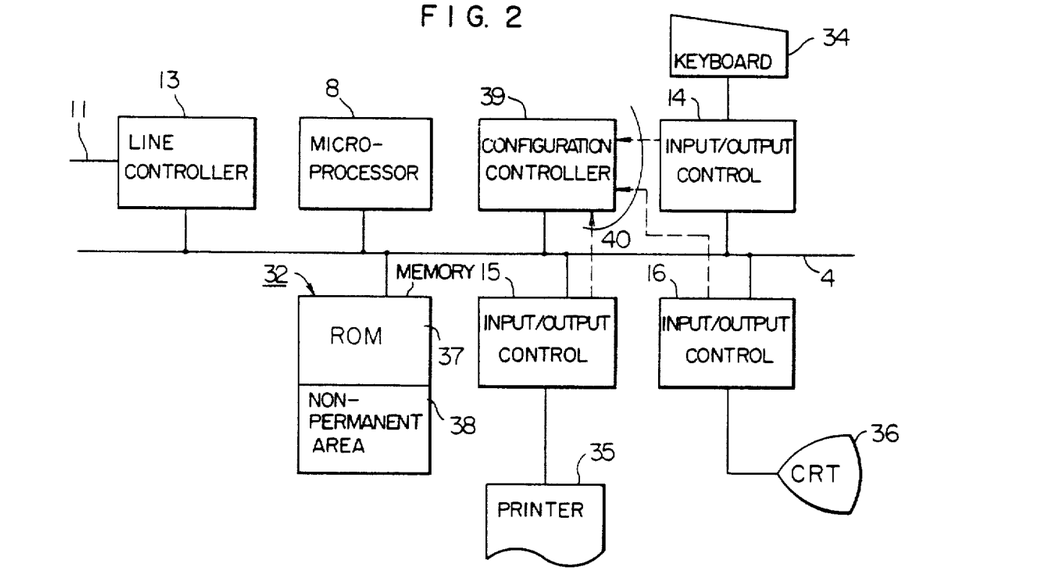
FIG. 2 shows in a block diagram an exemplary arrangement of a terminal equipment.

Referring to FIG. 2, the terminal 2 includes a plurality of input/output devices i.e. a keyboard 34, a printer 35, a CRT display 36 and other devices, all of which are conventional. These input/output devices 34, 35 and 36 are connected to a common bus 4 by way of respective input/output control units 14, 15 and 16 which serve to control inputting and outputting of data to and from the associated input/output devices 34, 35 and 36. Additionally, there is connected to the common bus 4 the microprocessor 8, a line controller 13, the memory 32 and a configuration controller 39.

The line controller 13 is further connected to the line 11 and serves to control transmission and reception of data to and from the central processing unit (i.e. host computer) 1.

The memory 32 has a ROM area 37 and a non-permanent area 38. The ROM area 37 is destined for storing therein a terminal identification code, while the non-permanent area 38 is used for storing the terminal diagnosis microprogram 301 supplied through the line 11. In this connection, it should be understood that the terminal identification code is a bit pattern which represents the nature or structure of the associated terminal determined in accordance with a convention established for the whole system, wherein different terminals are previously assigned with different bit patterns. The microprocessor 8 reads out the terminal identification code stored in the ROM 37 in accordance with the terminal diagnosis microprogram 301 stored in the non-permanent area 38 and additionally derives configuration control information from the configuration controlling unit 39. Moreover, the microprocessor 8 performs predetermined arithmetic operations such as addition, subtraction, multiplication, division, shift, inversion and other operations on three values, that is, the value of the terminal identification code, the value of the actual configuration control information and the value of certain fixed data present in the diagnosis microprogram in accordance with the diagnosis microprogram 301 to thereby perform an enciphering operation with respect to these three values. The result of the arithmetic operations, that is, the enciphering result, is transmitted to the host computer 1 through the line controller 13 and the line 11.

The configuration controller 39 serves to prepare configuration control information of a single word or one byte on the basis of information which is available from the individual input/output control units 14, 15 and 16 through configuration data lines 40 and represents configurations of the input/outout devices 34, 35 and 36 included in the terminal 2.

Figure 3:
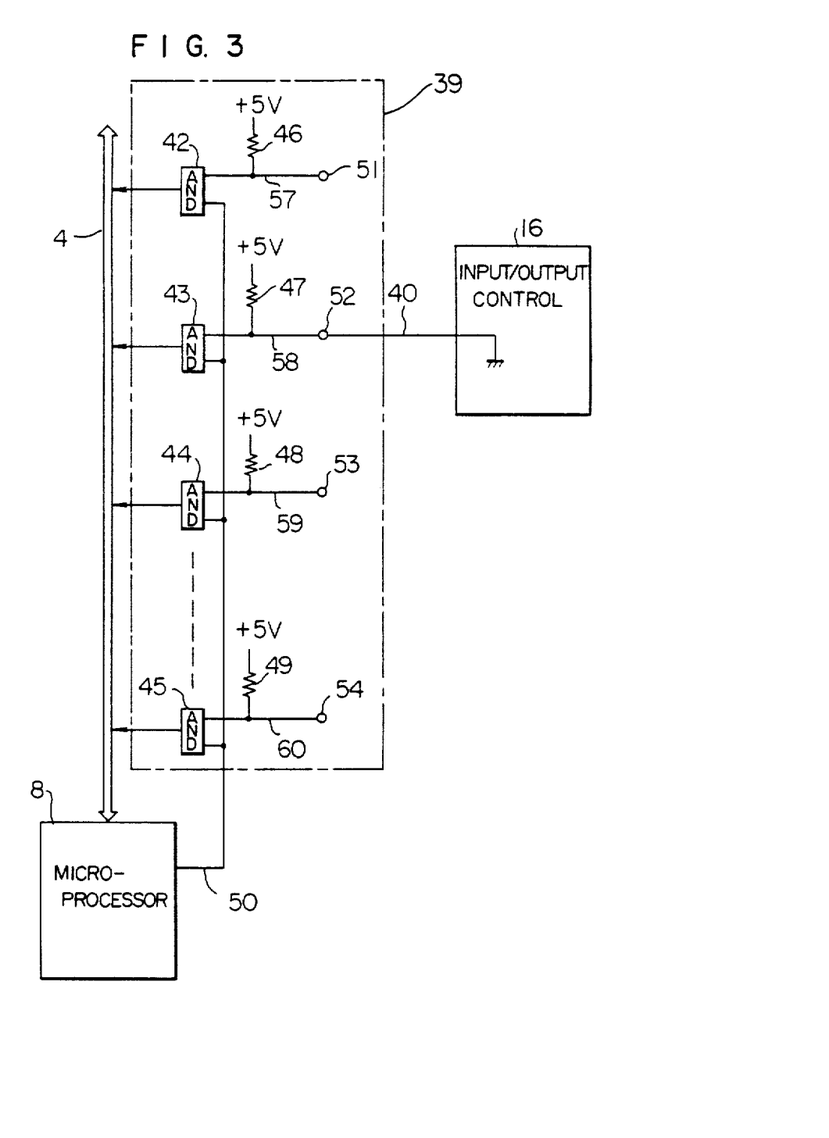
FIG. 3 shows in a block diagram details of a configuration controller employed in the terminal equipment.
Figure 4A:
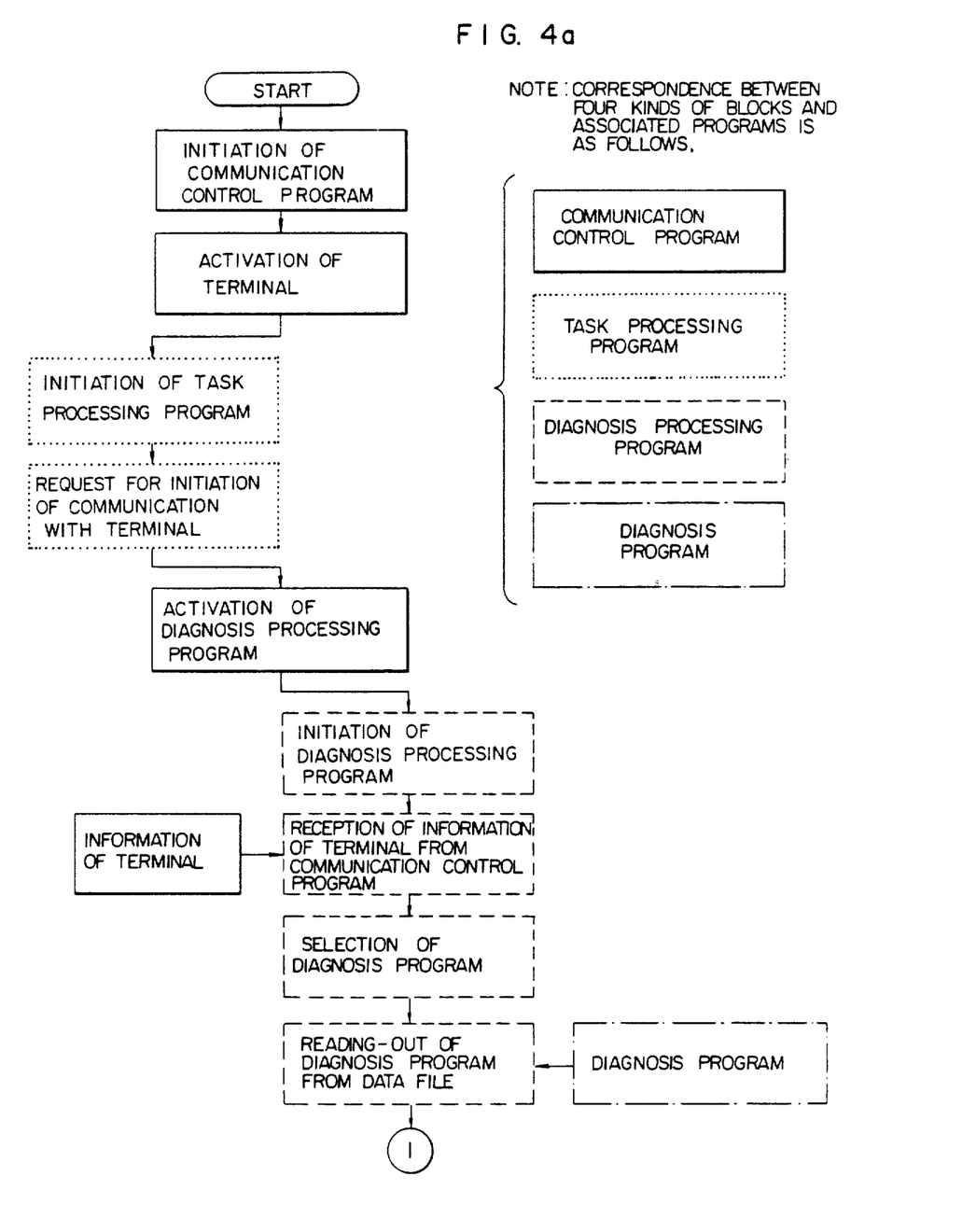
FIGS. 4a to 4d show flow charts of programs to illustrate operation of the data processing system according to an embodiment of the invention.
Figure 4B:
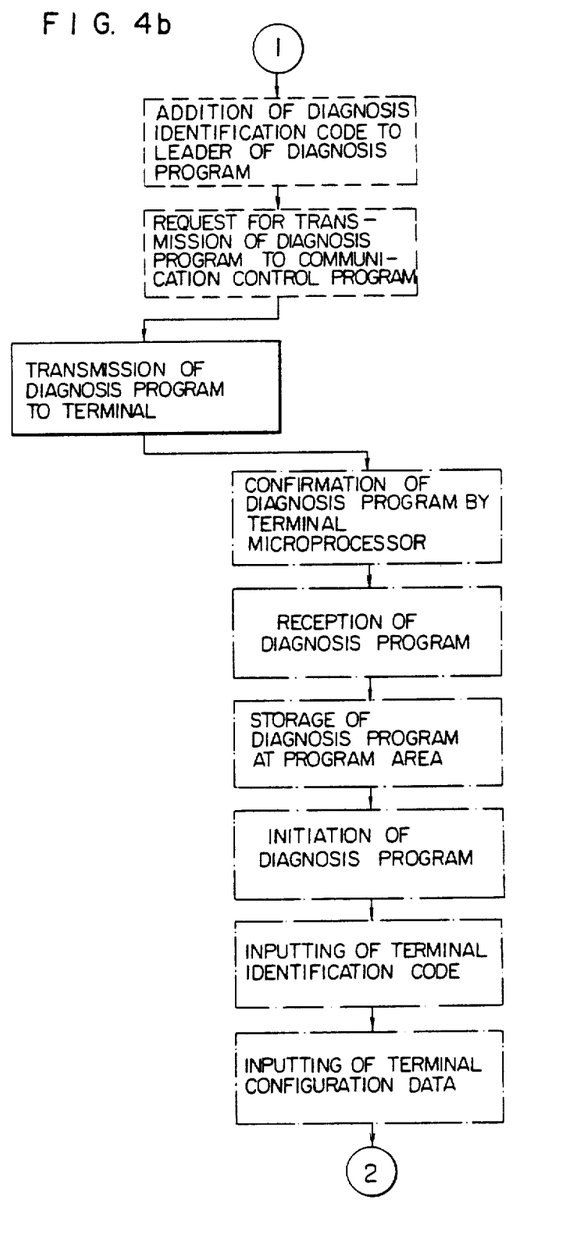
Figure 4C:
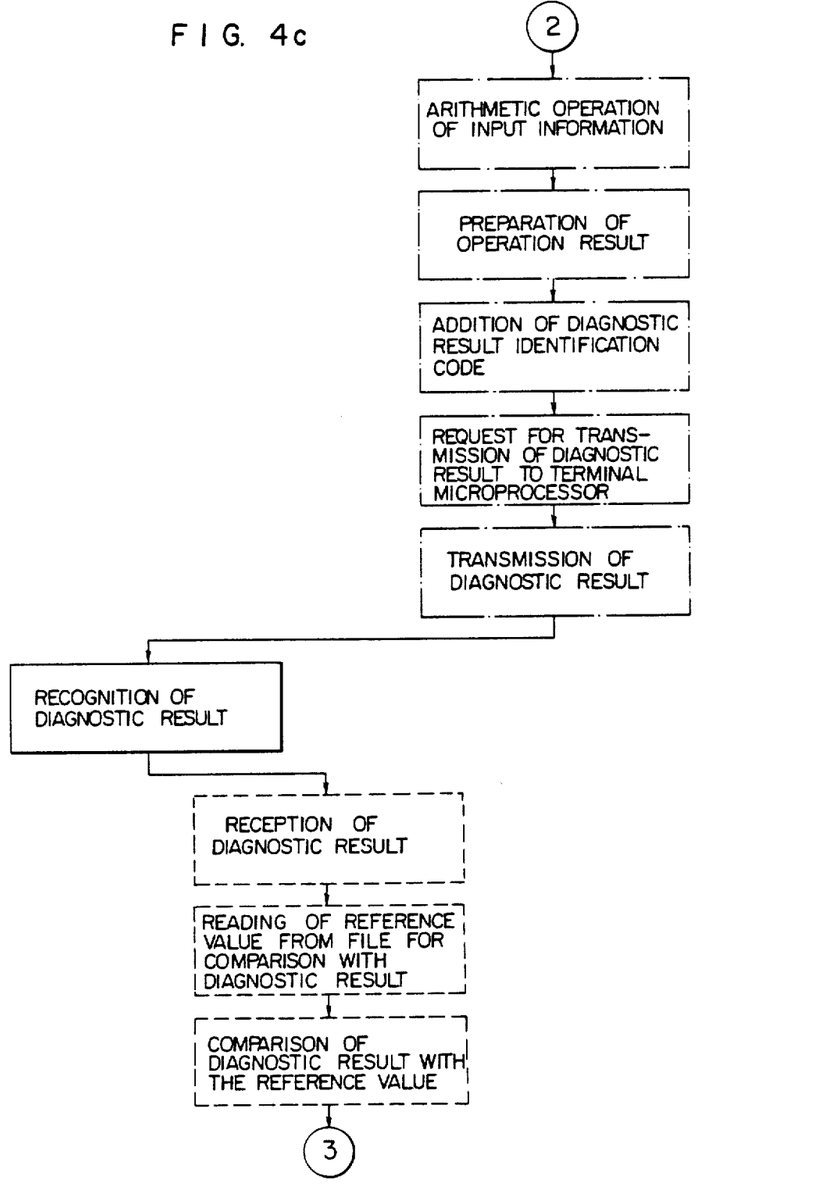
Figure 4D:
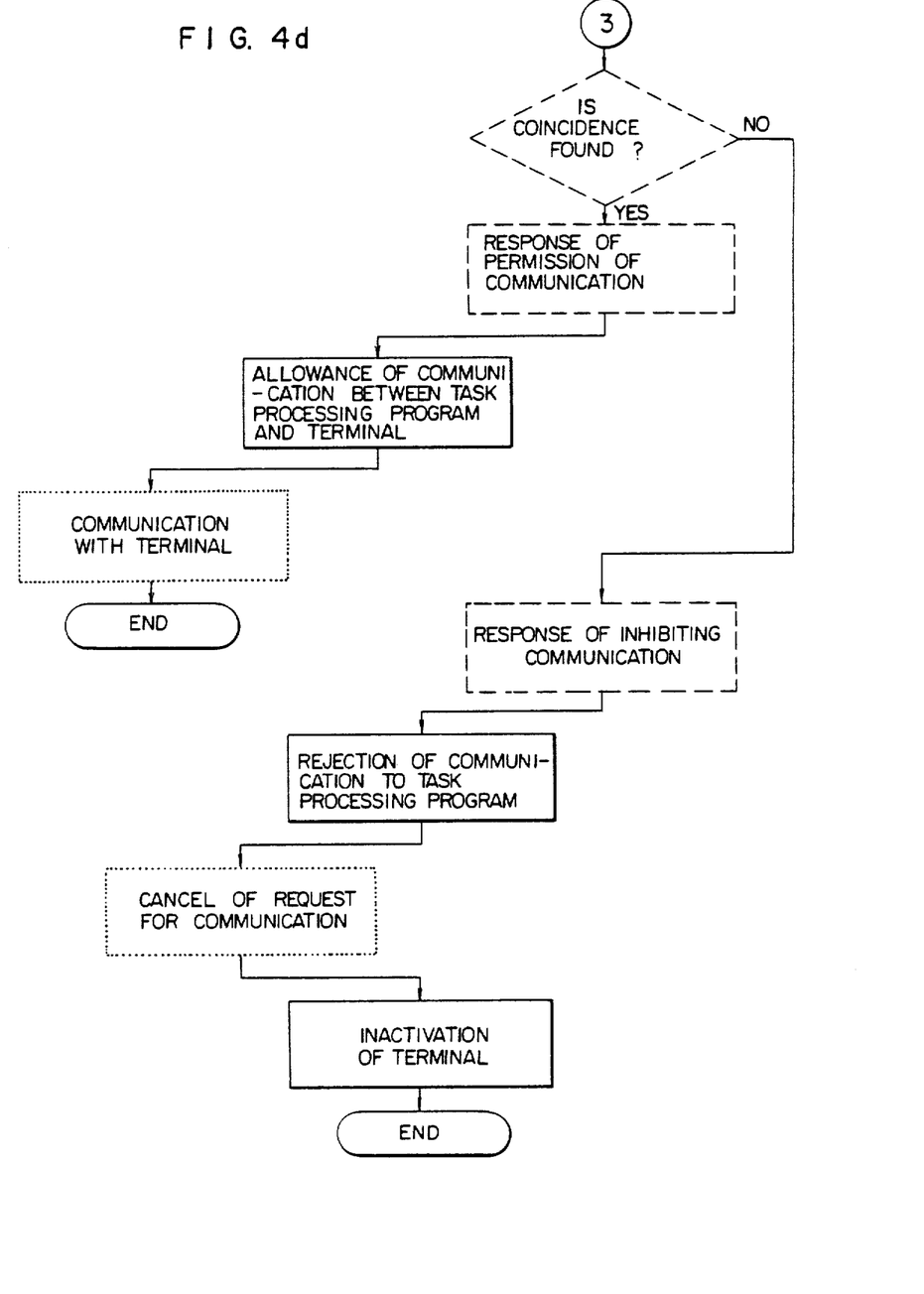

FIG. 3 shows in detail an arrangement of the configuration controller 39. Referring to this figure, there are provided a plurality of AND gates 42, 43, 44 and 45 whose outputs are coupled to the common bus 4. Each of the AND gates 42, 43, 44 and 45 has one of the inputs supplied with a strobe or enabling signal 50 from the microprocessor 8. The other input of the gates is connected, respectively, to one of a number of signal lines 57, 58, 59 and 60 which are pulled up by respective resistors 46, 47, 48 and 49. The signal lines 57, 58, 59 and 60, respectively, connection or signal terminals 51, 52, 53 and 54 which may selectively be connected to, for example, the input/output control device 16 through the configuration data line 40. The number of the input/output control devices as provided correspond to the number of the connection terminals 51, 52 53 and 54. When the microprocessor 8 executes an instruction "INPUT", the configuration controller 39 receives the input strobe or enable signal 50. At that time, assuming, for example, that an input/output control device is not connected to the connection terminal 51 to retain a high potential level, the AND gate 42 is opened by the strobe signal, whereby an output signal logic "1" makes an appearance on the bus 4. On the contrary, when the input/output control device 16 is connected to the connection terminal 52, as seen in FIG. 3, the potential at the connection terminal 52 is caused to drop to the ground potential level or logic "0" through the configuration data line 40, resulting in a signal of logic "0" being outputted from the AND gate 43 onto the bus 4. In this manner, data having a bit pattern representative of the configuration of the input/output control device array can be produced on the basis of predetermined combinations or correspondences between the individual signal terminals 51, 52, 53 and 54 and the input/output control devices.

Next, by referring to FIGS. 4a to 4d, description will be made of the operation of the data processing system of the arrangement mentioned above. For the purpose of illustration, it is assumed that four programs take part in the operation of the data processing system in the case of the present exemplary embodiment. The four programs include a communication control program (data) composed of a flow of processing steps represented by solid line blocks, a task processing program (data) composed of a flow of execution steps represented by dotted line blocks, a diagnosis processing program (data) composed of a flow of execution steps represented by broken line blocks, and a diagnosis program (data) composed of a flow of processing steps represented by single dotted broken line blocks.

At the beginning, an operator inputs commands and parameters into the operating system. In accordance with the inputs, a relevant communication control program (data) stored in the data file 7 is read out and stored in a main memory (not shown) incorporated in the host computer 1, whereupon the control operation to be carried out in accordance with the communication control program is ready to be initiated. Subsequently, the terminal equipment 2 is activated. More particularly, the communication control program issues an access signal to the terminal equipment 2 with which communication is to be established. When a response from the terminal 2 is confirmed, this means that the terminal 2 has been activated by the communication control program. Then, communication between the terminal 2 and the host computer 1 is started.

Subsequently, the task processing program stored in the data file 7 is read out and transferred to the memory of the host computer in response to commands and parameters inputted into the host computer by the operator, whereby the task processing program unit 5 is activated to thereby give to the communication control program a signal requesting the start of communication with the terminal. The task processing program is placed in the standby state until a response to the communication start request signal is issued.

In response to reception of the communication start request signal from the task processing program unit 5, the communication control program reads out a diagnosis program from the data file and stores it in the memory of the host unit, with a view to checking whether or not the task processing program may be put into communication with the terminal in question. The diagnosis processing program unit is thus activated, whereby the processing to be executed in accordance with the diagnosis processing program is started.

In the execution of the diagnosis processing program, various information relating to the terminal in question is supplied to the memory of the host computer at an address where the communication control program is stored. By the term "information relating to the terminal" is meant information which is defined on the host computer side including, for example, data about the type, model, components, presence or absence of accessories and so forth of the terminal in question. This information or data is stored in the data file 7. The information or data of the terminal to which the request for communication is at present issued from the task processing program is read out from the data file 7 under the control of the communication control program and stored in the memory of the host computer 1. With the diagnosis processing program, a diagnosis program of the terminal to which the request for communication is being issued is selected on the basis of the information relating to the terminal in question from a group of the diagnosis programs stored in the data file 7 and transferred to the memory of the host computer to be stored therein. At that time, the identification code of the several-byte length identifying the diagnosis program is added to the leading portion of the diagnosis program read out from the data file 7, as described hereinbefore.

Next, a signal requesting transmission and an address of the diagnosis program are given by the diagnosis processing program to the communication control program for effecting transmission of the diagnosis program to the terminal in question. In response, the communication control program sends out data on a byte-by-byte basis to the address of the terminal in question through the line 11 from the address of the of the host computer designated by the diagnosis processing program. Thus, the data is sent to the terminal 2 by means of the line 11.

Upon acquisition of data from the line 11, the microprocessor 8 of the terminal 2 determines with the aid of the leading several bytes, i.e. the identification code, whether or not the succeeding data is of the diagnosis program.

When the diagnosis program has thereby been confirmed, data of the length designated by the diagnosis identifying code is fetched by the line controller 13 from the line 11 and stored in a memory incorporated in the line controller 13. Subsequently, the data of the diagnosis program received by the line controller 13 is successively loaded byte-by-byte into the non-permanent area 38 of the memory 32 under the command of the processor 8. When all of this data has been stored in the non-permanent area 38, the subsequent control is handed over to the diagnosis program. In this way, execution of the diagnosis program is initiated.

When the diagnosis program is thus activated, a request for loading the terminal identification code is issued to the address of the ROM 37 at which the identification code is stored. The terminal identification code thus obtained is set in an area of the microprocessor 8 according to the diagnosis program. Subsequently, a request for configuration control information relating to the terminal is issued to the configuration controller 39 by the diagnosis program and set in an area reserved in the diagnosis program. On the basis of the terminal identification code and the information about the terminal configuration control thus obtained, arithmetic operations as required are executed. The result of the arithmetic operation is transferred to the diagnosis program unit. At that time, a diagnosis result identification code of a several-byte length is added to the leading portion of the diagnosis program area destined for storing the result of the arithmetic operation.

Next, the result of the arithmetic operation is to be transmitted to the host computer. To this end, the address of the area in which the result of the arithmetic operation is stored and a signal requesting the transmission are issued to the microprocessor 8 by the diagnosis program. In response thereto, the processor 8 transfers successively the data from the designated area to the memory of the line controller 13 on the byte-by-byte basis, while the line controller 13 in turn sends out the data on the line 11.

The communication control program receives data from the line 11. When it is determined that the leading several bytes represent the diagnosis result identifying code, the succeeding data is acknowledged to be the result of the diagnosis, whereby a signal confirming the reception of the diagnosis result is issued to the diagnosis processing program.

In response to the signal confirming the reception of the diagnosis result, the diagnosis processing program stores the data received by the communication control program in an area of the diagnosis processing program. Further, the diagnosis processing program reads out a reference value (fixed value) 33 of the selected diagnosis program for diagnostic comparison and stores it in an area reserved in the diagnosis processing program. The reference value for the diagnostic comparison is then compared with the diagnostic result obtained for the terminal 2 in question.

When the comparison results in coincidence, the diagnosis processing program sends a reply signal representing the permission for communication to the communication control program.

On the other hand, the communication control program gives to the task processing program a signal allowing the communication between the task processing program and the terminal equipment in question. The task processing program then initiates communication with the terminal in question after having confirmed the permission for communication. In this manner, the transmission and reception of data with the terminal equipment are carried out through transaction of data with the communication control program.

When no coincidence results from the aforementioned comparison, the diagnosis processing program issues to the communication control program a signal representing the inhibition of communication. Then, the communication control program supplies to the task processing program a signal indicating that the communication with the terminal equipment in question is not allowed.

The task processing program confirms the inhibition of communication with the terminal equipment as issued from the communication control program and resets the request for initiating communication with the terminal as held until then. Subsequently, the communication control program resets the signal being issued to the terminal in question and inactivates the terminal by disconnecting it, since the terminal is not allowed to communicate with the task processing program.

In the foregoing, an exemplary embodiment of the present invention has been described. It will however be appreciated that many modifications or variations may readily occur to those skilled in the art. For example, although the microprogram for diagnosis has been described to control the reading-out of the terminal identification code and the acquisition of the configuration control information in the case of the illustrated data processing system, a part of the work of the diagnosis microprogram may be allotted to the terminal itself in a version of the embodiment. For example, a program for extracting and processing the configuration control information may previously be prepared and stored in the permanent or resident area (ROM) 37 in the terminal, wherein the configuration control information extracting and processing program is activated during the initial operation phase of the terminal as triggered upon power-on thereof, to thereby prepare the configuration control information in the manner described hereinbefore. Subsequently, the microprogram provided on the side of the host computer utilizes the configuration control information to thereby obtain the result of the arithmetic operations. In this way, not only the burden imposed on the host microprogram can be reduced, but also the time which elapses from the loading of microprogram to the completion of the arithmetic operation can be significantly decreased.

In another version, the whole microprogram may previously be stored in the permanent area or ROM 37 in the terminal so that the host computer may furnish solely parameters for initiating the microprogram and the required data.

We claim:

1. A data processing system including a host unit and a plurality of terminals connected to said host unit;
said host unit comprising designation means for designating a selected arithmetic operation, means for transmitting the designation of said selected arithmetic operation to a given terminal, and checking means for checking the result of the arithmetic operation designated by said designation means and executed in the given terminal;
said terminals each comprising first memory means for storing therein information for identifying the respective terminal, a processor responsive to the designation of said selected arithmetic operation received from said designation means in said host unit for executing the arithmetic operation on the identifying information stored in said first memory means and means for transmitting the result of the arithmetic operation to said host unit; and
said checking means including means for receiving said result of said executed arithmetic operation from said given terminal and means for determining whether or not said result of the arithmetic operation received from said given terminal corresponds to an expected value.

2. The system according to claim 1 wherein said designation means designates a certain numerical value as well as said selected arithmetic operation and said transmitting means operates to transmit both said designation of said selected arithmetic operation and said certain numerical value to said given terminal, and wherein said processor in said given terminal is responsive to the designation of said selected arithmetic operation received from said designation means for executing that arithmetic operation on the identifying information stored in said first memory means and the certain numerical value also received from said designation means.

3. The system according to claim 1 wherein each terminal includes a plurality of components capable of being connected to said processor in a plurality of different configurations and second memory means for storing configuration information indicating the configuration of the components of the terminal and wherein said processor is responsive to the designation of said selected arithmetic operation received from said designation means for executing that arithmetic operation on the identifying information stored in said first memory means and the configuration information stored in said second memory means.

4. The system according to claim 3 wherein said designation of said selected arithmetic operation is in the form of programs for executing an arithmetic operation, and wherein each terminal further comprises third memory means for storing the programs for executing said selected arithmetic operation designated by said designation means, and said processor operates to execute said selected arithmetic operation on the basis of the programs stored in said third memory means.

5. A method of operating a data processing system including a host unit and a plurality of terminals connected to the host unit, said terminals each including first memory means for storing therein identifying information for identifying the respective terminal, second memory means for storing a program including steps for executing a selected arithmetic operation, and a processor responsive to the program stored in the second memory means for executing processings in accordance with the program, comprising the steps of:

(a) loading said program from said host unit into said second memory means;

(b) executing arithmetic operations on the identifying information stored in said first memory means in said processor on the basis on the program in said second memory means;

(c) transferring the result of the executed arithmetic operations from said processor to said host unit; and (d) receiving the transferred arithmetic operation result and determining whether the same corresponds to an expected value.

* * * * *